United States Patent [19]

Anderson

[11] Patent Number: 5,361,503
[45] Date of Patent: Nov. 8, 1994

[54] ACCESSORY FOR CARPENTER LEVELS

[76] Inventor: Carl E. Anderson, 1625 Palo Verde Dr., Rapid City, S. Dak. 57701

[21] Appl. No.: 72,844

[22] Filed: May 26, 1993

[51] Int. Cl.⁵ .............................................. G01C 9/32
[52] U.S. Cl. .................................... 33/348.2; 33/379; 362/32; 362/120
[58] Field of Search ...................... 33/347, 348, 348.2, 33/379; 362/32, 101, 120, 370, 396, 191

[56] References Cited

U.S. PATENT DOCUMENTS

| | | | |
|---|---|---|---|
| 1,268,622 | 6/1918 | Reynolds | 362/396 |
| 3,114,507 | 12/1963 | Dommer | 33/348.2 |
| 3,192,375 | 6/1965 | Olson | 33/348.2 |
| 3,751,655 | 8/1973 | Codrino | 362/32 |
| 4,394,714 | 7/1983 | Rote | 362/32 |
| 4,542,447 | 9/1985 | Quackenbush | 362/191 X |
| 5,025,567 | 6/1991 | McWilliams et al. | 33/348.2 |

OTHER PUBLICATIONS

Dolan–Jenner "Fiber Optic Selection Guide", Woburn, Mass. Catalog SG305, 1992, pp. ii, 1, 13, 19.

Primary Examiner—William A. Cuchlinski, Jr.
Assistant Examiner—Alvin Wirthlin
Attorney, Agent, or Firm—Hugh E. Smith

[57] ABSTRACT

An accessory for addition to a standard carpenter's level includes: a light source fastenable into the finger slot common to such levels and fiber optic, light-transmitting tubes extending from the light source to illuminate the bubble vials of the level.

1 Claim, 3 Drawing Sheets

ACCESSORY FOR CARPENTER LEVELS

BACKGROUND OF THE INVENTION

1. Field of the Invention

The present invention relates to carpenter levels and more particularly pertains to means which may be used to illuminate the bubble vials thereof.

2. Description of the Prior Art

The use of lighted bubble vials in carpenter levels is known in the prior art. More specifically, devices heretofore devised and utilized for the purpose of such illumination are known to consist basically of familiar, expected and obvious structural configurations, notwithstanding the myriad of designs encompassed by the crowded prior art which have been developed for the fulfillment of countless objectives and requirements. Such devices have been built into the levels as a component thereof, requiring the purchase of a complicated level. Instances of such are shown in U.S. Pat. Nos. 5,075,978; 5,025,567; 5,020,232; 4,912,854; 4,876,798; 4,407,075; and Des. 269,255.

In this respect, the device according to the present invention substantially departs from the conventional concepts and designs of the prior art, and in so doing provides an apparatus primarily developed for the purpose of being added to any existing carpenter's level without requiring the purchase of a new and complicated level and in case of malfunction, allowing replacement of the illuminating unit only.

Therefore, it can be appreciated that there exists a continuing need for new and improved carpenter's level illuminating systems which can be economically added to existing levels. In this regard, the present invention substantially fulfills this need.

SUMMARY OF THE INVENTION

In view of the foregoing disadvantages inherent in the known types of illuminated carpenter levels now present in the prior art, the present invention provides an improved construction wherein the same can be utilized as an add-on to an existing conventional carpenter's level. As such, the general purpose of the present invention, which will be described subsequently in greater detail, is to provide a new and improved illumination device for a carpenter's level.

To attain this, the present invention essentially relates to an accessory for addition to a standard carpenter's level which comprises: a light source; means to fasten said light source into the finger slot common to such levels; and fiber optic, light-transmitting tubes extending from said light source to illuminate the bubble vials of said level.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is an object of the present invention to provide a new and improved accessory for carpenter's levels which may be easily and efficiently manufactured and marketed.

It is a further object of the present invention to provide a new and improved accessory for carpenter's levels which is of a durable and reliable construction.

An even further object of the present invention is to provide a new and improved accessory for carpenter's levels which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved illuminating accessory for carpenter's levels which provides in the apparatuses and methods of the prior art some of the advantages thereof, while simultaneously overcoming some of the disadvantages normally associated therewith.

Still another object of the present invention is to provide a new and improved device for illuminating the bubble vials of a conventional carpenter's level.

Yet another object of the present invention is to provide a new and improved means for illuminating the bubble vials of existing carpenter's levels.

Even still another object of the present invention is to provide a new and improved accessory for addition to existing carpenter's levels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
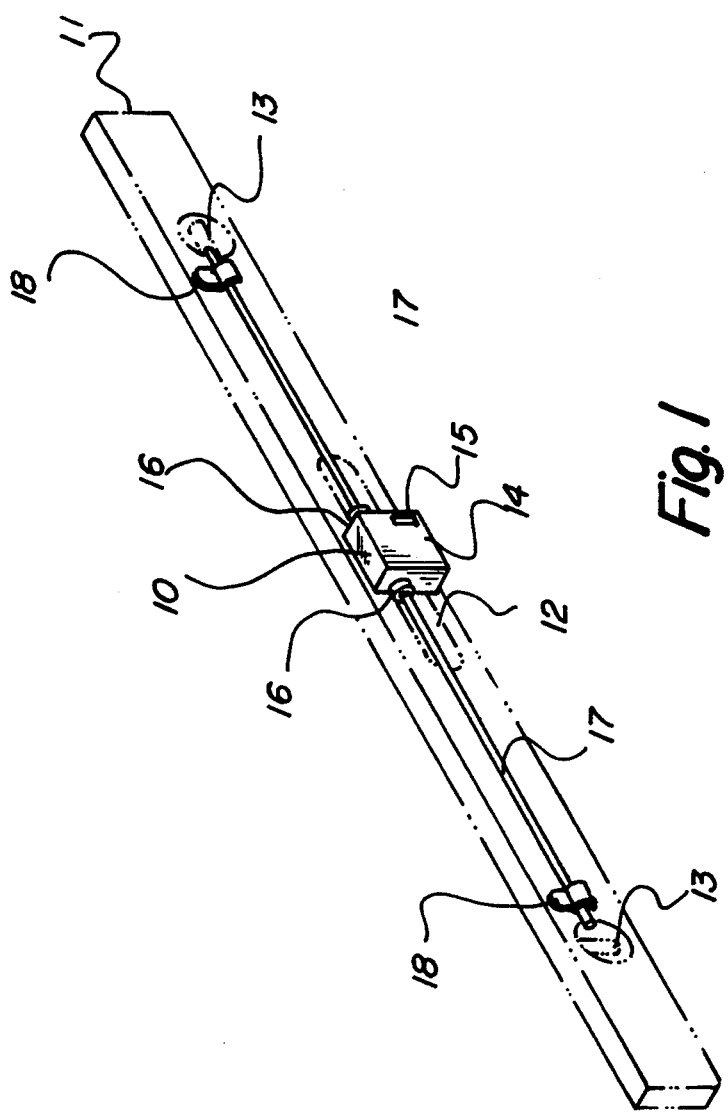
FIG. 1 is a perspective view of the accessory of the present invention mounted in place on a conventional carpenter's level.

With reference now to the drawings, and in particular to FIG. 1 thereof, a new and improved accessory for carpenter's levels embodying the principles and concepts of the present invention and generally designated by the reference numeral 10 will be described.

The accessory 10 is shown mounted on a conventional carpenter's level 11 (shown in broken lines) having a finger slot 12 in the center thereof as is common in such levels and a pair of bubble vials 13 disposed within and near the ends thereof, again as is common with such levels. The accessory 10 comprises a substantially light-tight enclosed light source 14 having an on-off switch 15 thereon. Such light source 14 is disposed and arranged in the center of the level with attachment means (shown below) removably affixing such light source 14 in engagement with the level in the finger slot 12 thereof. Extending from and through bushed openings 16 in light source 14 are a pair of light-conducting fiber optic tubes 17. Such tubes 17 extend outwardly from each side of light source 14 to points adjacent the bubble vials 13 of such level whereby light from source 14 is transmitted to and illuminates such bubble vials when switch 15 is in the "on" position. Although not essential to the invention due to the usually relatively short length of tubes 17 and to the rigidity thereof, a pair of strap clamps 18 may be provided adjacent the ends of such tubes 17 and fastened to the level as by screws or the like.

Figure 2:
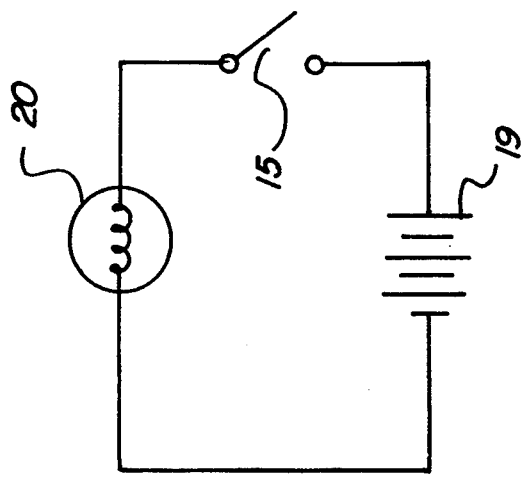
FIG. 2 is a schematic of the electrical wiring of the light source component of the present invention.

The light source 14 as shown in FIG. 2 utilizes a simple electrical circuit comprising the on-off switch 15 and wires leading from a battery 19 to a light bulb 20.

Figure 3:
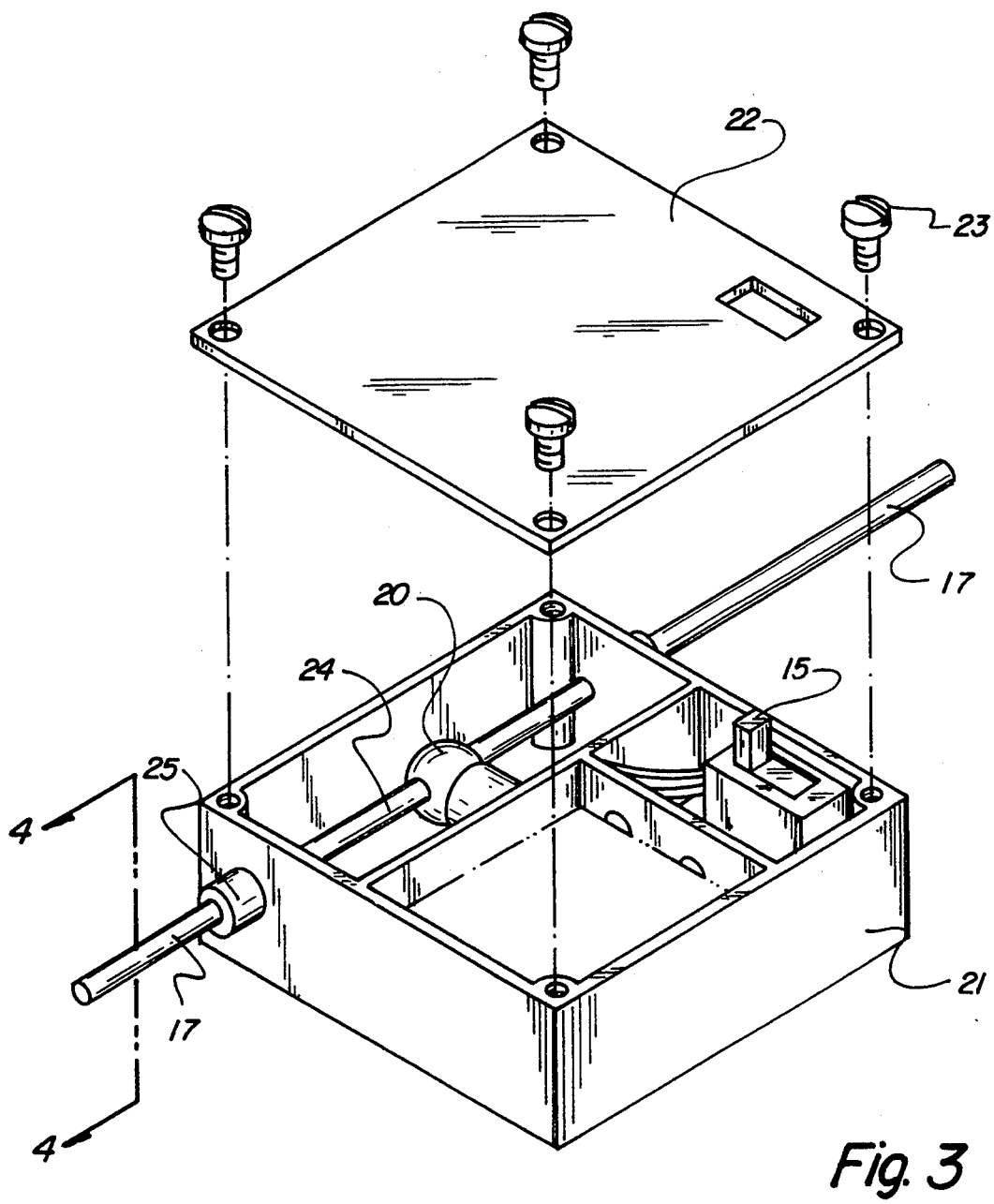
FIG. 3 is an exploded perspective view of the light source of the present invention.

FIG. 3 shows an exploded view of light source 14 wherein the unit is a substantially enclosed outer case 21 with an openable top 22 held in place by machine screws 23. Case 21 may be made of rigid plastic, light steel, aluminum or the like. When closed only two openings 16 exist in such case 21, making it essentially light-tight. Openings 16 permit the insertion of fiber optic tubes 17 therethrough with their inner ends 24 adjacent the light bulb 20. When the tubes 17 exit case 21, each extends through an elastomeric bushing 25 which snugly fits tubes 17 and holes 16 allowing no light leakage.

Figure 4:
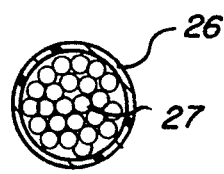
FIG. 4 is a sectional view of one of the fiber optic tubes of the present invention taken on line 4—4 of FIG. 3.

FIG. 4 illustrates a cross-section of tube 17 showing the external rigid casing 26 thereof encasing a plurality of fiber-optic filaments 27 therein.

Figure 5:
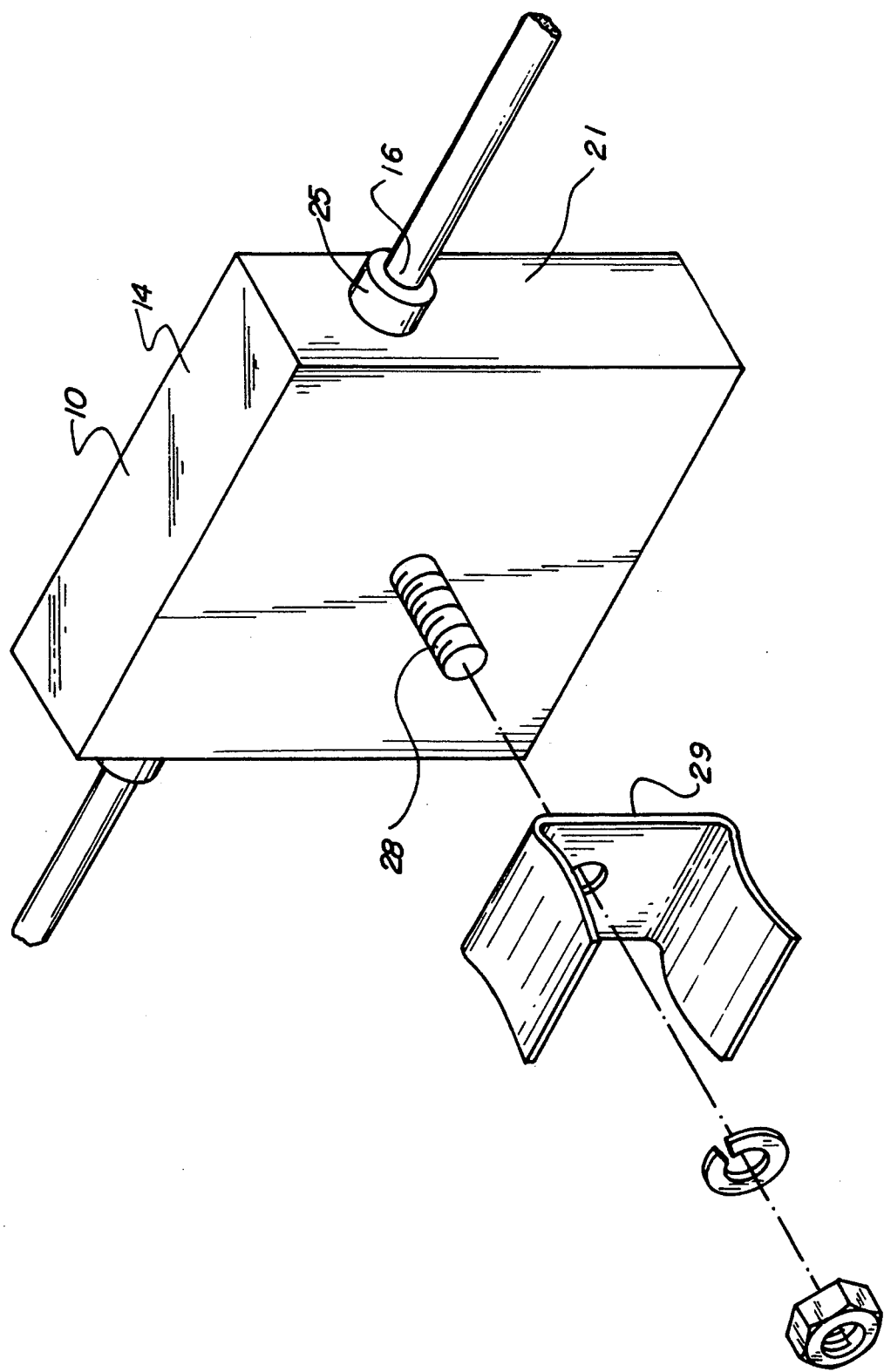
FIG. 5 is an exploded perspective view of the device of the present invention particularly showing the mounting means thereof.

FIG. 5 shows case 21 of light source 14 with the tubes 17 extending from bushed holes 16 thereof. Mounted on one side of case 21 and extending therefrom is a threaded stud member 28. Adapted to mount on said stud 28 is a clip member 29 made of spring steel or rigid plastic having similar elastic properties thereto. The extending flanges 30 and 31 of clip 29 are spaced to engage within and press against the surfaces defining the finger slot 12 of a carpenter's level. Such clip 29, which is held in place by a nut and washer 32 and 33, threaded onto stud 28 after it passes through clip 29, will hold the accessory 10 firmly to the carpenter's level with which it is engaged in use, yet will be readily removable for transfer to another level or for repair or replacement should such become necessary.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed as being new and desired to be protected by Letters Patent of the United States is as follows:

1. A new accessory for addition to a carpenters level having a finger slot with defining surfaces and bubble vials located on said level, said accessory comprising:
   an enclosed light source having a pair of opposed openings;
   a pair of elastomeric bushings, one of said bushings being concentrically positioned within each of said openings;
   means for mounting said light source to said level, said means including a clip coupled to said light source and having spaced extending flanges for engaging said surfaces defining said finger slot to secure said light source to said level;
   and,
   a pair of fiber optic tubes each extending outwardly from said light source through one of said bushings to a point adjacent each of said bubble vials to illuminate said bubble vials, each of said fiber optic tubes comprising an external rigid casing encasing a plurality of fiber-optic filaments therein;
   wherein said plurality of fiber-optic filaments comprises 25 fiber-optic filaments;
   wherein said clip is made of spring steel;
   and wherein said light source includes a threaded stud projecting therefrom, and said clip is coupled to said light source by a nut threaded onto said stud to capture said clip between said nut and said light source.

* * * * *